FIG. 1

INVENTOR
W. H. T. HOLDEN
BY
J. W. Schmied
ATTORNEY

W. H. T. HOLDEN
SELECTIVE SIGNALING SYSTEM USING
RECTIFIERS BACK TO BACK

2,586,821

Filed Feb. 18, 1949

INVENTOR
W. H. T. HOLDEN
BY
J. W. Schmied
ATTORNEY

FIG. 5

Patented Feb. 26, 1952

2,586,821

UNITED STATES PATENT OFFICE 2,586,821

SELECTIVE SIGNALING SYSTEM USING RECTIFIERS BACK TO BACK

William H. T. Holden, Woodside, N. Y., assignor to Bell Telephone Laboratories, Incorporated, New York, N. Y., a corporation of New York Application February 18, 1949, Serial No. 77,077

11 Claims. (Cl. 177—353)

The object of this invention is to provide simplified selective systems utilizing rectifiers having less than infinite resistance in their non-pass direction.

Another object is to improve selective systems wherein selection is more effectively accomplished in systems employing two sources of pulses, one of which is furnished from a distribution means for distributing pulses over a number of leads in a fixed time relationship and the other of which furnishes intermittent pulses over a common path from a plurality of sources.

A feature of the invention consists in the employment of the leakage properties of rectifiers whereby a leakage current due to a voltage applied upon one member of a pair of rectifiers in the non-pass direction is conducted to ground over a low impedance path in a pass direction through the opposing member of the pair unless, at the same instant, a voltage of the same sign in the opposite direction with respect to the pair is applied in the non-pass direction to the other member of the pair.

A feature of the invention comprises the use of two rectifiers in pairs with a voltage operated device such as a gas-filled cold cathode tube having its voltage control element such as the trigger or ionizing element of the tube connected between the pairs whereby voltages applied to both members of the pair simultaneously in their non-pass directions produce a positive voltage sufficient to operate the voltage operated device whereas a voltage of the same value applied to one member of the pair at a time does not operate the voltage operated device; a subsidiary feature comprises a slow operate relay having its winding in an interrupted current or alternating current supplied path controlled by the voltage operated device whereby a continuing operated condition may be maintained by the relay if the voltage operated device is repeatedly primed at short intervals but becomes non-conductive on current interruptions or negative parts of the current supplied over the path.

A feature of the invention consists in the application of the arrangement in the control portion of an otherwise known type of telephone system wherein organizations of rectifiers according to the invention are employed as the receiving means of an arrangement for sending information individually from any one of a plurality of senders of a sender group to a marker group wherein the individual mechanisms of a group, such as a sender group in an automatic telephone system, are connected permanently to all of the individual controlling mechanisms of a second group, such as the group of switch controlling markers, and in which the signal information is transmitted from the senders to the markers by the impulses of a group which vary in phase or otherwise and which are transmitted during each of a succession of cyclically recurring impulse periods, each period in the cycle representing a particular one of the markers and the particular sender from which it is receiving the signal information. By means of a relatively simple selecting circuit arrangement each calling sender appropriates for its use the first idle one of the markers and excludes other senders from the use of the seized marker. During each of the successive impulse periods a plurality of impulses of different phases are produced, and the particular marker which is characterized by such impulse period is enabled to the exclusion of the remaining markers. According to the information registered in the sender that has seized the enabled marker, impulses of the appropriate phase are transmitted from the sender over the common signaling conductors to the enabled marker where they serve to register the information corresponding to that first registered in the sender. Since the other markers are disabled during this particular impulse period, they are not affected. During the remaining impulse periods of the cycle, representing the corresponding markers, phase impulses are transmitted from the senders over the common signaling conductors to the corresponding markers which have been seized by these senders, only one marker being enabled in each impulse period to permit the signal information to pass to such marker to the exclusion of all others. Therefore, several signaling channels may exist concurrently between senders and markers, and the information pertaining to each sender and its associated marker is transmitted over the common connecting conductors or medium without interference with other channels.

Another exemplary disclosure of a useful form of the invention consists of rectifiers combined with discharge tubes in an alarm circuit which is maintained unresponsive so long as simultaneous voltages from two sources are applied to each member of the pairs of rectifiers in their non-conduction directions.

By means of the application of an embodiment of the invention in a system of this kind, the system is reduced in cost by the substitution of a number of simple and cheap rectifiers in place of relatively expensive coils, the use of three element discharge tubes in the place of four element tubes and an improvement in the reliability and over-all operation.

These arrangements as employed in a particular telephone system are exemplary rather than restrictive disclosures of useful applications of the invention.

The foregoing and other features of the invention will be discussed more fully in detail in the following specification.

In the drawings accompanying the specification:

Figs. 1 to 6, when arranged as illustrated in Fig. 7, disclose certain parts of an automatic telephone system incorporating the features of the invention.

Fig. 1 illustrates in diagrammatic manner the line switch and certain of the selector switches of an automatic telephone exchange and also a sender link or sender selector switch for associating the calling lines with idle common register senders;

Figs. 2 and 3 show a portion of one of the common register senders;

Fig. 4 shows at the left two sets of conductors extending to other register senders and at the right it also shows a counting mechanism for producing cyclically the periods during which the successive markers are in a receptive condition;

Fig. 5 shows a portion of one of the common switch controlling markers; and

Fig. 6 illustrates diagrammatically two more of the common markers and also shows a continuity checking arrangement for continually monitoring the condition of the common conductive system connected between the senders and the markers, said arrangement incorporating rectifiers functioning according to the principles of the invention.

The exemplary arrangement in which the present invention is usefully applied relates to the transfer of signal information over a common medium between sending devices of one group and receiving devices of a second group, such as are useful in automatic telephone systems where registered designations and other kinds of information must be transferred from one part of the system to another during the controlling operations incident to the establishment of the desired connections. Therefore, the application of the invention has been illustrated herein as a portion of the interconnecting means between the common register senders and the common switch controlling markers of an automatic telephone exchange system of the well-known cross bar type. For a better understanding of the various operations involved in these systems and of the details of the equipment used, reference may be had to numerous patents, including the patents to W. W. Carpenter, 2,093,117 of September 14, 1937, and 2,235,803 of March 18, 1941.

Referring to the drawings, the subscribers' lines appear in the cross bar switches 100 and through these switches have access over trunks 101, 102 to the district selector switches 103. The district selectors have access over trunks 104 to office selector switches 105, and these in turn have access to the groups of outgoing trunks 106. The calling lines also have access through the sender selector switches 107 to the common register senders which receive and store the telephone designations.

Three of these senders, 200, 400 and 500, are illustrated or indicated in the drawings, and as many more could be provided as are needed to handle the traffic through the office. The senders are seized at random in response to calling lines and receive and register the designations transmitted from the calling substations. Thereafter the senders transfer these registered designations to the common switch controlling markers, which in turn make use of the designations received from the senders to control the selective operation of the automatic switches for routing the calls. Three of the common switch controlling markers, markers 500, 600a and 600b, are shown in the drawings or indicated and as many more would be provided as are needed.

In the present system, however, intermediate connecting devices between the senders and the markers have been eliminated, and a common system of transmitting conductors 210 is connected permanently and in multiple between all of the senders 200, 400, 500, etc., and all of the common markers 600, 600a, 600b, etc. The signal information for a plurality of senders, which may be taken for concurrent use, is transmitted over the conductors 210 to the respective markers without mutual interference by the use of impulse signals occurring in different time periods and in different phases in each of said periods.

Each of the register senders includes registers for the office and numerical portions of the telephone designations, means for transmitting the office registration over the common medium to the associated marker, and the usual means for transmitting the numerical designation to distant senders, together with controlling relays and circuits. Two office code registers 201 and 202 have been shown in full in the sender 200, the assumption being that the office part of the designation consists of two letters or other characters. Two groups of transmitting tubes 203 and 204, associated with the registers 201 and 202, respectively, serve to transmit the office registration over the conductors of the group of conductors 210 to the associated marker. The sender 200 is also provided with a marker selector or allotter 300 comprising space discharge tubes 301, 302, 303, there being one of these tubes for each of the markers to which the sender has access. Furthermore, the sender 200 is equipped with a plurality of groups of discharge tubes 205, 206, 304, each group consisting of ten tubes, there being as many of these groups as there are markers to which the sender has access. The purpose of the tubes 205, 206, 304 is to select from the cyclically recurring periods the particular period representing the marker which has been seized by the sender and to deliver to the transmitting tubes 203 and 204 during the selected period the impulses which serve to characterize the values of the code digits registered on the registers 201 and 202 of the sender. To this end one of the groups 205, 206, 304, namely, the group characterizing the seized marker, is rendered effective by the particular one of the tubes 300 which operates to cause the seizure of said marker and the remaining groups of tubes remain ineffective.

In like manner each of the remaining senders is provided with a marker-allotter, with transmitting tubes, and with a plurality of groups of tubes corresponding to the groups 205, 206, 304, for selecting the proper periods for the signal transmission. The several allotters are so related to each other that each calling sender selects and seizes the first available idle marker, and each busy marker is rendered unselectable to all other senders. Thus, if a plurality of senders are concurrently associated with a corresponding number of markers, the transmitting tubes of these senders are rendered effective during the respective transmitting periods corresponding to the seized markers. In other words, one of the calling senders will transmit its signal information over the common conductor system 210 to the associated marker during the particular one of the sending periods which characterizes said associated marker; the next sender will transmit its information during the particular period characterizing the marker with which it is associated; and the same is true of each of the remaining senders which may concurrently use the transmitting medium.

The marker 500 (and the same is true of each of the other markers) is equipped with two relay registers 501 and 502 for registering the office code digits and with corresponding sets of discharge tubes 503 and 504 which receive from the sender the impulses representing these digits and cause the operation of the corresponding relays of said registers. The marker is also provided with two sets 505 and 506 of receiving tubes, one for each of the office code digits, which receive the digit impulses incoming over the conductors 207 and 208 from the sender. These receiving tubes 505 and 506 are rendered effective only during the impulse period which characterizes the marker 500 and are ineffective to receive impulse signals during the transmitting periods characterizing other markers. The effectiveness of these receiving tubes 505 and 506 is controlled by the timing mechanism 401 which cyclically produces impulses at periods characterizing the different markers.

The marker is also provided with the necessary routing relays and other controlling circuits and devices whereby the office designation registered on the registers 501 and 502 is utilized to determine and control the selective operation of the switches 103 and 105. These controlling means are indicated by the rectangle 507 and have not been shown in detail; they are well understood in the art.

Figure 6:
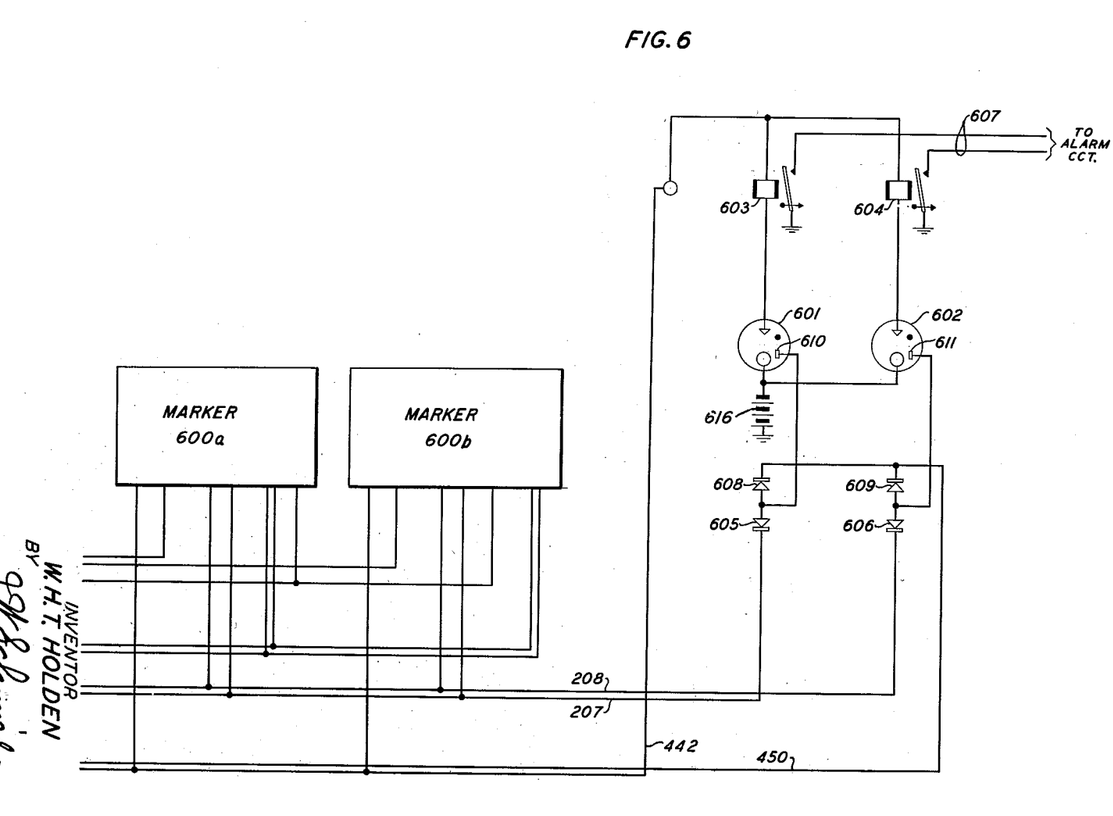

The phase impulses by which the signal information is transferred from the senders to the markers are produced by a common impulse generator 402. The energy for operating this generator is supplied from an alternating current source 403 and its periodicity is set thereby. The generator in response to each cycle of the source 403 produces impulses of a different phase in each one of the phase circuits of the generator. There are twelve of these phase circuits, designated 0–11, and the first ten of them, designated individually 0–9 and as a group 405 are used for sending the signal information between the senders and the markers. The eleventh phase, designated 10, is used for the marker testing mechanism shown in Fig. 6, and the twelfth phase, designated 11, is used to operate the period measuring mechanism 401. The first ten phase circuits 405 are connected over corresponding conductors 406 to the primary windings of the ten transformers 211, 212, 213, having their secondaries connected to the anodes of the ten tubes of the group 205. More specifically, the conductor 407, to which impulses of phase No. 0 are delivered by the generator 402, is connected to the transformer 211 associated with the No. 0 tube 214. Likewise the remaining conductors of the group 406, including conductor 409 to which impulses of phase No. 9 are delivered, are connected to the transformers associated with the remaining tubes of the group 205. Furthermore, the ten impulse conductors 406 are multipled and connected to the input transformers associated with the respective tubes of each of the remaining groups 206, 304, etc. Thus the signal impulses of the ten different phases are applied once per cycle of the generator 402 to the anodes of the corresponding tubes of the groups 205, 206, 304, etc. Because only one of these groups in a particular sender is effective, such as in sender 200, only the tubes of the effective group discharge and pass impulses to their associated transmitting tubes 203 and 204. Furthermore, only one tube in each of the groups 203 and 204 is rendered effective by applications of anode battery over the corresponding registers 201 and 202. Hence an impulse of the phase corresponding to the operated relay of register 201 is transmitted through the corresponding tube 203 to the common conductor 207 and thence to the receiving tubes 505 of all markers. Likewise a single impulse corresponding to the operated relay of the second register 202 is transmitted through the corresponding tube 204 and over conductor 208 to the receiving tubes 506 of all markers.

The discharge tubes 203, 204, 205, 206, 304, 306, 503, 504, 505, 506 and the tubes 601 and 602 may be of a type having triggering or discharge initiating electrodes. These are sometimes characterized in the art as cold cathode gas-filled tubes. The tubes of the group 401 may also be of the gas-filled type, but these are preferably equipped with heated cathodes.

The impulse generator 402 may be of any suitable type whereby brief impulses of positive polarity of twelve successive phases are applied to the output terminals in successive time order during each cycle of the source 403. Generators of this type are illustrated in the application of W. H. T. Holden, Serial No. 361,536, filed October 17, 1940, now Patent No. 2,324,394, dated July 13, 1943; and the patents to W. H. T. Holden, No. 2,252,766, of August 19, 1941, and No. 2,285,815 of June 6, 1942.

The operation of the transmitting system will now be described in detail. For this purpose it may be assumed that a call is made by the subscriber of line 110. A call by this subscriber causes the operation of the line switch 100 to extend the line over an idle junctor 101 to the district selector 103 and also through the sender selector 107 to an idle one of the register senders such as the sender 200. Upon the seizure of the sender the start relay 305 operates in a known manner and closes a discharge circuit as follows for the tube 306: from negative battery 307, contact of relay 305, resistor 308, control gap electrodes of the tube 306, resistor 309 to positive battery 310. The tube 306 ionizes its control gap, and current flows in the main discharge circuit of said tube, including the slow-release relay 311 and the alternating current source 312. The relay 311 operates and holds its armature during the time the voltage from the alternating current source 312 is passing through zero value at each alternation. Relay 311 connects positive battery 313 through resistor 314 to the main anodes of all of the tubes 301, 302 and 303. The operation of relay 305 also connects negative battery 307 through resistor 315 to the start cathodes of all of the tubes 301, 302 and 303. The start anodes of these tubes are connected over conductors 316, 317, 318 through the potentiometers 401, 402, 403, respectively, to ground. These potentiometers are also connected to respective ones of the phase impulse conductors 406. As illustrated, the potentiometers are connected respectively to the No. 0, No. 1 and No. 9 phase impulse conductors 407, 408, 409; although they may be connected as desired to any corresponding number of these conductors. The purpose of the connections through these potentiometers 401, 402, 403, etc., is to deliver potential impulses at successive intervals of time to the starting anodes of the allotter tubes 300.

Assume that the No. 0 marker 500 is idle at the time the sender 200 is seized and the start relay 305 operated and that the impulse generator 402 has just passed the phase corresponding to the last idle marker in the group following marker 500 at the time relay 305 is operated to condition the allotter tubes 300. When, therefore, the generator 402 commences its next cycle and an impulse of positive polarity is generated in the No. 0 phase conductor 407, this impulse is applied through the potentiometer 401 over conductor 316 to the starting anode 319 of tube 301. Since negative potential is applied to the starting cathode 320 of this tube, the voltage across the control gap 319—320 is sufficient to ionize the tube. The momentary flow of current through the resistance 315 when the control gap ionizes alters the potential of the starting cathodes of the remaining tubes 302 and 303 of the sender 200 to inhibit the ionization of a second one of these tubes when the starting anode thereof is raised to a positive potential in response to the next phase impulse. The ionization of the control gap of the tube 301 causes transfer of the ionization to the main gap, and current now flows from the positive pole of battery 313, contact of relay 311, resistance 314, anode 321, main cathode 322, conductor 323, inductor 304a, resistance 305a to the negative pole of battery 306a. Since the inductor 304a is common to the allotter tubes in all senders corresponding to tube 301, the voltage drop produced by the inductance of this element alters the potential on the cathodes of these tubes to prevent another one of them from discharging and seizing the same marker. As soon as the current flow in the main discharge circuit of tube 301 reaches a steady state the voltage drop across the common resistor 305a serves the same purpose of preventing another one of the senders, that may be seeking a marker while sender 200 is in use, from causing the discharge of its allotter tube corresponding to the tube 301. Thus the tube 301 of the calling sender 200, which identifies the idle marker 500, has been operated to the exclusion of the remaining tubes of the allotter 300 and while it remains in its operated condition guards against the subsequent operation of the corresponding tube in any other one of the senders.

The operation of tube 301 effects the seizure of the marker 500 by energizing the group of tubes 205 representing said marker to the exclusion of the remaining tube groups 206, 304, etc., representing other markers. The flow of current in the main discharge circuit of the tube 301 raises anode 324 to a positive potential with respect to the cathode 322. This positive potential is transmitted over conductor 325 through resistors 216, 217, 218 to the starting anodes of tubes 214, 215, 219 of the group 205. Since the cathodes of these tubes are at negative potential the starting gaps of all tubes ionize. For example, the circuit for ionizing the starting gap of tube 214 may be traced from conductor 325, resistor 216, starting anode 220, cathode 221, transformer winding 222 to the negative pole of battery 223. The other tubes of the group 205 are ionized in similar circuits.

The sender 200 having been seized and connected to the calling subscriber's line 110, the subscriber now proceeds to operate his dial to send the wanted designation, including the office code digits and the usual numerical digits, into the sender. The two code digits cause the operation of the registers 201 and 202 in a well-known manner, and one of the relays in each of these registers is energized to register the value of the digits. Assume that the office code is represented by the digits 1–9, in which case the relay 224 of register 201 and relay 225 of register 202 are operated and all of the other relays of these registers remain deenergized. The operation of register relay 224 completes a circuit from positive battery 235, contact of relay 224, resistor 244, starting anode 236 of transmitting tube 233, cathode 237, conductor 207 through the primary winding of transformer 508 to the negative pole of battery 509. The voltage applied to the control gap of tube 233 in this circuit causes the tube to ionize preparatory to the transmission of a signal impulse from the sender to the marker representing the office code digit 1. Similarly, the operation of register relay 225 closes a circuit from the positive pole of battery 235, contacts of relay 225, resistor 245, starting anode 238 of tube 239, cathode 240, conductor 208, the primary winding of transformer 510 to the negative pole of battery 511. The control gap of tube 239 ionizes in this circuit preparatory to the transmission of the signal impulse representing the code digit No. 9.

It will also be assumed that the subscriber of another line, such as line 120, initiates a call at about this time. Line 120 is extended over the line switch 100 to an idle junctor 102 and through the sender selector switch 107 to the next idle sender in the group, such as sender 400. The seizure of sender 400 causes the closure of the start circuit and the operation of the allotter tube, corresponding to tube 302 of sender 200, assuming the next marker 600a to be idle. The operation of the tube in sender 400 representing the idle marker 600a serves to condition the group of tubes in sender 400 corresponding to the group 205 shown in full in the sender 200. In other words the initiation of a second call concurrently with the first one causes the selection of the second sender 400, if idle, which in turn seizes the next idle marker 600a and prepares the impulse transmitting tubes in the sender for sending its information during the transmission period of the seized marker. In like manner other concurrent calls result in the seizure of idle senders and the connection of these senders to respective idle markers. Assuming, however, that only the two senders 200 and 400 are in concurrent use at this time, an explanation will now be given of the manner in which the transmission periods are produced cyclically and of the manner in which these senders transmit their information over the common conductor system 406 to the associated markers during the transmission periods assigned to these particular markers.

As hereinbefore mentioned, the transmission periods are produced by the time assigning arrangement 401, which consists of a plurality of hot cathode gas-filled tubes 410, 411, 412, etc. The cathodes of these tubes are heated by filaments energized through the transformer 424 by a suitable source of alternating current 425. The tubes 410, 411, 412, which correspond to the respective transmission periods, are ionized and deionized in succession by impulses delivered from the generator 402 in the No. 11 phase position thereof. That is, once per cycle of the generator 402 an impulse is delivered over conductor 413 to the mechanism 401 to cause the ionization of the next succeeding tube and the deionization of the tube already in an ionized condition. The No. 11 phase position is chosen so that the transmitting tubes of the senders may be conditioned and ready to receive the designation impulses when, subsequently, the generator 402 passes through phase positions No. 0 to No. 9. In order to describe the details of the time assignor 401 it may be assumed that tube 412 is in an ionized condition. Therefore, current flows from the positive pole of battery 414 from the anode 418 to the cathode 419 of tube 412 through the resistor 415 to ground. This current flow raises the cathode to a positive potential with respect to ground, and charging current flows through the condenser 416 and resistor 417 to ground. The condenser 416 assumes a charged condition in this circuit. The positive potential of the cathode 419 is applied over conductor 434 through the potentiometer resistance 421 to the grid of tube 410, which is the next tube in the series. The resultant of this positive potential applied through the potentiometer resistance from the cathode 419 and the negative potential applied from the biasing battery 423 through resistor 422 renders the grid of tube 410 less negative than normal but not sufficiently positive to allow discharge to occur. The positive potential of the cathode 419 is also applied through the choke coil 426 over conductor 427 through the windings of the associated transformers to the anodes of the ten tubes of the group 304 in the sender 200 and likewise to the anodes of the corresponding groups of tubes in all of the other senders. Since, however, the marker 600b to which the group of tubes 304 relates is not in use at this time, the application of this potential to the anodes of these tubes is without effect.

When the generator 402 completes its next cycle and reaches phase No. 12, designated 11, an impulse is applied over conductor 413 to the potentiometer resistance 428 and thence through condensers 429, 430 and 431 to the grids of the tubes 410, 411, 412, respectively. The normal negative potential of the grid of tube 411 applied thereto by the battery 423, is sufficiently high so that the positive impulse applied to the grid through condenser 430 does not cause the tube to discharge. The grid of tube 410, however, is more positive than its normal biasing potential by reason of the positive potential of the cathode 419 of the operated tube 412. Therefore, when the positive impulse is applied through the condenser 429, the grid of tube 410 is made sufficiently positive to cause this tube to discharge. Current now flows from battery 414 through the anode 432, cathode 433 and resistor 417 to ground. The positive potential of the cathode 433 is now applied over conductor 420 to the right-hand terminal of the charged condenser 416. This raises the potential of the other terminal of condenser 416 and cathode 419 to a value sufficient to extinguish the discharge in the tube 412. Thus the impulse applied to the conductor 413 ionizes the next tube 410 and extinguishes the preceding tube 412. As soon as the tube 412 is extinguished, the condenser 416 dissipates its charge through resistances 415 and 417. The positive potential of the cathode 433 causes the charging of condenser 435 through the resistor 436. Also the positive potential of cathode 433 is applied through the potentiometer resistor 438 to render the cathode of the next tube 411 more positive than normal, thus conditioning the tube 411 for operation when the next impulse is received. As soon after the tube 410 discharges as the surge is absorbed by the choke coil 439 and condenser 440, the full positive potential of the cathode 433 is applied over conductor 441 through the windings of transformers 211, 212, 213 to the anodes of all ten tubes in the group 205 and similarly to the anodes of the tubes of the corresponding group in each of the other senders.

Because the control gaps of the ten tubes 205 are ionized as above explained, current now flows through the main discharge gaps of these tubes. For example, the circuit for the flow of current in the main discharge gap of tube 214 may be traced from conductor 441, to which positive potential is applied by the timing arrangement 401 during this period, winding of transformer 211, main anode 226, cathode 221, transformer winding 222 to the negative pole of battery 223. Similar circuits are traceable from the remaining tubes in the group 205. During this transmission period, which continues as long as the tube 410 of the mechanism 401 is in a conducting condition, and during which period the relays of the group 205 are conducting, the generator 402 passes through its first ten phases No. 0 to No. 9 and transmits impulses of these phases over the conductors 405 and 406 to the primary windings of the transformers 211, 212, 213, associated with the anodes of the tubes 205. For instance, in phase No. 0 of the generator 402 an impulse is transmitted over conductor 407 through the primary winding of transformer 211 to ground. This impulse is induced in the secondary winding of transformer 211 and produces a corresponding increase in the current flow through the transformer winding 222. This increased flow of current produces an induced impulse in the transformer winding 227 which appears as a positive potential impulse on the anodes 228 and 229 of the No. 0 transmitting tubes 230 and 231, respectively. Similarly, in phase No. 1 of the generator 402 an impulse is transmitted over conductor 408 through the primary winding of transformer 212, and a corresponding impulse is produced in the transformer winding 232 and appears as a potential impulse on the anodes of the two No. 1 transmitting tubes 233 and 234. Likewise, each of the remaining eight phase impulses are sent in succession to the remaining tubes of the group 205 and are reproduced as impulses on anodes of the corresponding transmitting tubes of the groups 203 and 204. Although these impulses are applied to the anodes of all tubes in the groups 203 and 204, discharge occurs only in the main gaps of tubes 233 and 239, these being the only tubes that have their control gaps ionized in response to the operation of the register relays 224 and 225. Therefore, current flows from the anode 241 of the ionized tube 233 to cathode 237 thence over conductor 207 through the primary winding of the transformer 508 to the negative pole of battery 509. Likewise current flows from anode 242 to cathode 240 thence over conductor 208 through the primary winding of transformer 510 to the negative pole of battery 511. Similarly these signal impulses, which are transmitted from the sender 200 over the conductors 207 and 208 to the marker 500 in phase positions No. 1 and No. 9, are also transmitted to each of the remaining markers 600a, 600b, etc. As above mentioned, however, only the tubes 505 and 506 of marker 500 are in a transmitting condition during this transmission period. The ionization of these tubes during this period is effected over the circuits from conductor 441, on which a positive potential is maintained by tubes 410, resistors 530 and 531, windings of transformers 512 and 520, tubes 505 and 506, to ground, respectively, through the windings of transformers 508 and 510. Consequently the signal impulses transmitted over the conductors 207 and 208 are conducted through the tubes 505 and 506 but are not conducted through the corresponding tubes in any other marker.

When tube 505 transmits the incoming impulses of phase No. 1, an impulse appears in the secondary winding of transformer 512 and is applied to the upper terminals of all ten of the rectifiers 503a, 503b, . . . 503j. These positive pulses of voltage are applied to the rectifier to which they arrive most directly in the non-pass direction, i. e., the direction in which they offer a high resistance. At the same instant phase No. 1 of the generator 402 supplies over lead 408 a pulse of voltage to the rectifier 517b in the non-pass direction, i. e., in the direction to which it offers a high resistance.

We diverge now from the main thread of description to consider the properties of a rectifier combination such as 503b, 517b. A positive voltage applied to one rectifier across the combination, say to 503b, meets an impedance which looks like a high resistance in 503b and a low resistance in 517b. The voltage assumed by the common point is therefore low on the assumption that the path to ground or back to the negative terminal of the generator 402 which supplies the voltage to rectifiers 517a-517j is low both in voltage and impedance. As a condition, therefore, to satisfactory operation it will be preferred that the impedance to ground of leakage current passing through 503a-503j and proceeding through 517a-517j in the pass direction be low; this can be achieved if the inactive phases of generator 402 furnish low impedance and likewise the impedance from the rectifiers 503a-503j to ground through transformer primaries 512, 520 must be adequately low; these conditions may be readily realized.

The coincidence for any substantial time of two positive impulses or voltages applied to the rectifier combination such as 503b, 517b raises the mid-point between the two rectifiers to a potential approximating the lower of the two voltages; non-simultaneous voltages on one or the other will raise the potential of the mid-point very little. It is a necessary condition that the required ionizing potential of the trigger electrodes of tubes 512a-512j is higher than the maximum voltage resulting from a single pulse on either rectifier but below that resulting from simultaneous pulses on both rectifiers.

Returning now to the main thread of description, the voltage thus produced by the simultaneous applications of these impulse potentials, which are of identical polarity, to the starting electrodes of the tube 512b causes the ionization of the control gap, whereupon a discharge circuit for the main gap of the tube is closed from the generator supply lead 442, which has positive potential thereon at this time, through the winding of slow-release relay 516, anode 517 of tube 512b, cathode 518 to the negative pole of battery 519. Relay 516 operates in this circuit to register the code digit 1 in the marker. In like manner the transmission of phase impulse No. 9 through the ionized tubes 506 causes an impulse in the secondary winding of transformer 520, which impulse is applied to the starting anodes of all tubes in the group 504. At the same instant, namely in phase No. 9, an impulse is applied from the generator 402 over conductor 409 through the rectifiers 522j, 523j to the starting cathode of tube 523. The simultaneous potentials on the electrodes of tube 523 being of identical polarity, the tube ionizes its starting gap, and current flows from the generator supply lead 442 through the winding of slow-release relay 524, anode 525 of tube 523, cathode 526 to the negative pole of battery 519. Relay 524 operates to register the digit 9. Although phase impulses of the ten different phases are applied to all rectifiers 517a-517j and 523a-523j during this transmission period, only the two tubes 512b and 523 operate because these are the only tubes having adequate voltages applied to their starting anodes as a result of impulses in the common transmitting conductors 207 and 208. Therefore, only the register relays 516 and 524 operate as explained. The operation of these register relays 516 and 524 causes the selection and operation of the proper routing relay in the controlling and routing mechanism 507, the operation of the selector switches is determined with resultant routing of the call.

At the end of the transmission period just described, during which the registration was transmitted from the sender 200 to the associated marker 500, the generator 402 enters phase No. 11 and another impulse is transmitted over conductor 413 through the condensers 429, 430 and 431 to the grids of the tubes 410, 411, 412. Tube 412 is unaffected by this impulse, but tube 411, which has been conditioned by the operated tube 410, discharges, and current flows through the resistance 436 to ground. In the manner already described the discharge of tube 411 extinguishes the preceding tube 410 and conditions the succeeding tube 412 for operation at the end of the next transmission period. The inactivation of the tube 410 removes the positive potential from the conductor 441 and also from the anodes of the tubes of the group 205 in the sender 200 and from the corresponding group in each of the remaining senders. Consequently the tubes 205 and the corresponding tubes in other senders cease to conduct current through their main discharge gaps.

The flow of current through the resistance 436 when the tube 411 discharges as above explained causes the application of a positive potential through the choke coil 443 over conductor 444 through the associated transformer windings to the anodes of the ten tubes of the next group 206 of the sender 200 and of the corresponding group in each of the remaining senders. The application of this potential to the anodes of the tubes 206 is without effect since the sender 200 at this time is associated with marker 600, and the tubes 206 are inactive. In the sender 400, however, which is associated with marker 600a at this time, the ten relays corresponding to relays 206 have their control gaps ionized, and the application of the positive potential over conductor 444 to the anodes of these tubes in the sender 400 causes them to discharge their main gaps preparatory to the transmission of signal impulses through the tubes corresponding to the transmitting tubes 203 and 204 and thence over the common transmission conductors 207 and 208 to the marker 600a. Thus as the impulse generator 402 passes through its phases No. 0 to No. 9 for the next period impulses of the particular phases characterizing the operated register relays in the sender 400 are transmitted over the conductors 207 and and 208 and are recorded only on the registers of the marker 600a with which sender 400 is associated.

At the end of this second transmission period the time counting tube 412 discharges and extinguishes the preceding tube 411 and prepares the sender 500 for transmitting its record, in case it is engaged at this time, to the marker with which it is associated. In like manner the transmission periods follow in succession under the control of the counting mechanism 401, and the records of all engaged senders are transmitted during the appropriate periods over the common system of conductors 406 to the associated markers.

After all controlling functions have been completed by the marker 500, the sender relay 305 may be released to open the ionizing circuit for the control gap of the tube 306. On the next negative half cycle of the source 312 the main gap of the tube 306 quenches, and relay 311 releases to open the discharge circuit of the allotter tube 301. The tube 301 quenches and removes potential from the starting anodes of the tubes 205 permitting these tubes to quench their control gaps. The quenching of the tube 301 also restores the potential of the main cathode of the corresponding tube in each of the remaining senders so that the marker 500 will appear idle to these other senders. Also the sender 200 is released after it completes all the functions necessary in connection with the extension of the calling line to its destination and is free for seizure by other calling subscribers' lines.

Figures 1, 7:
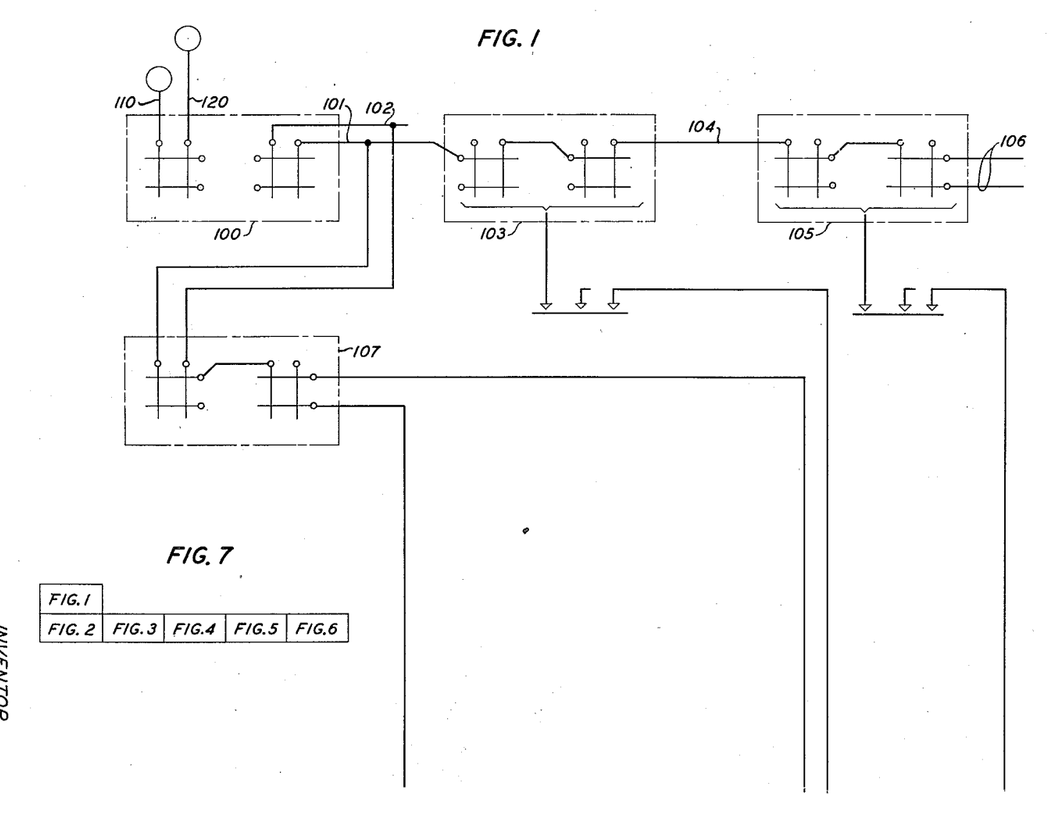
Figure 2:
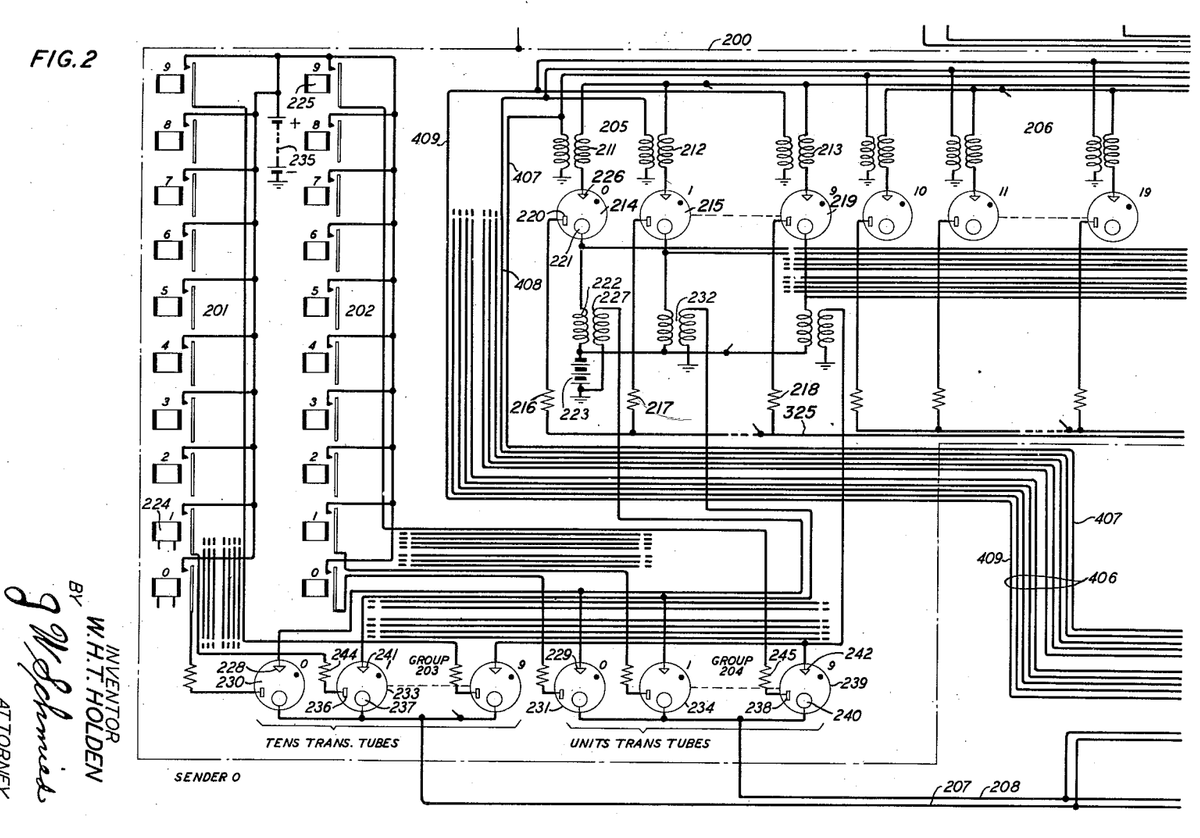
Figure 3:
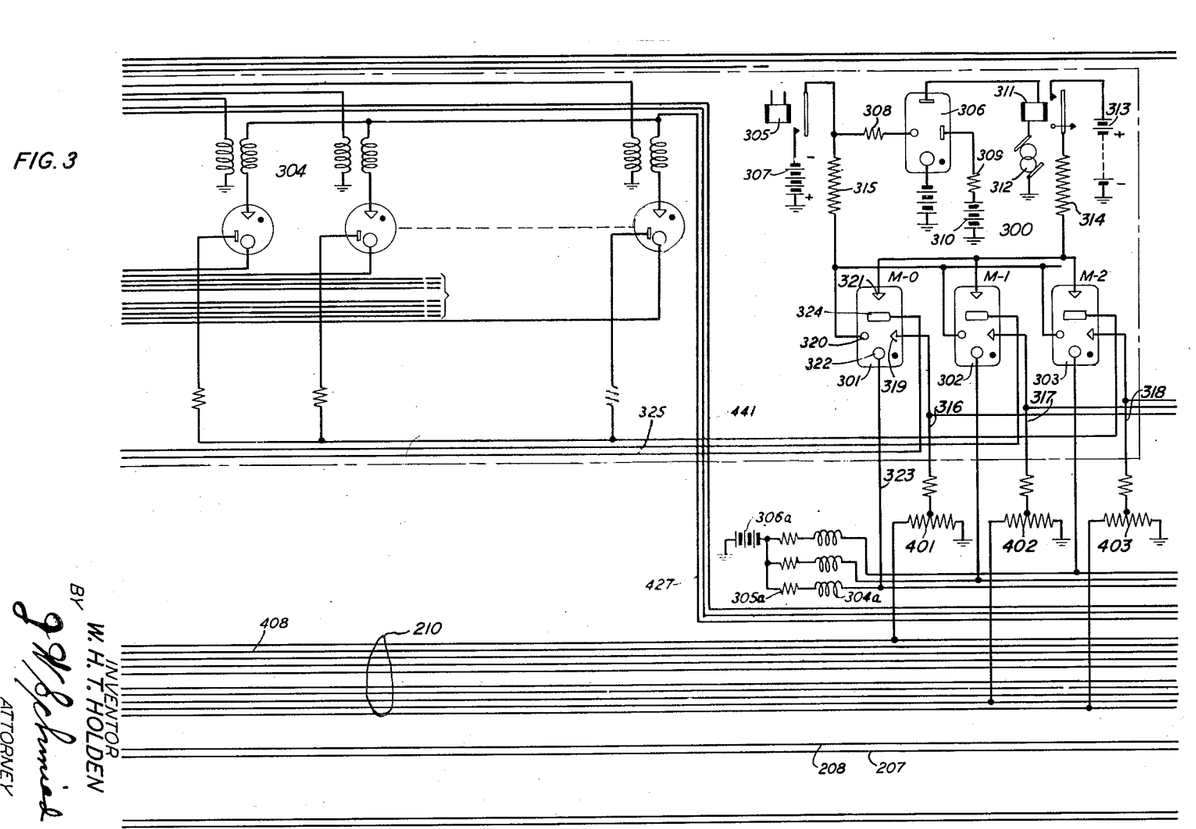
Figure 4:
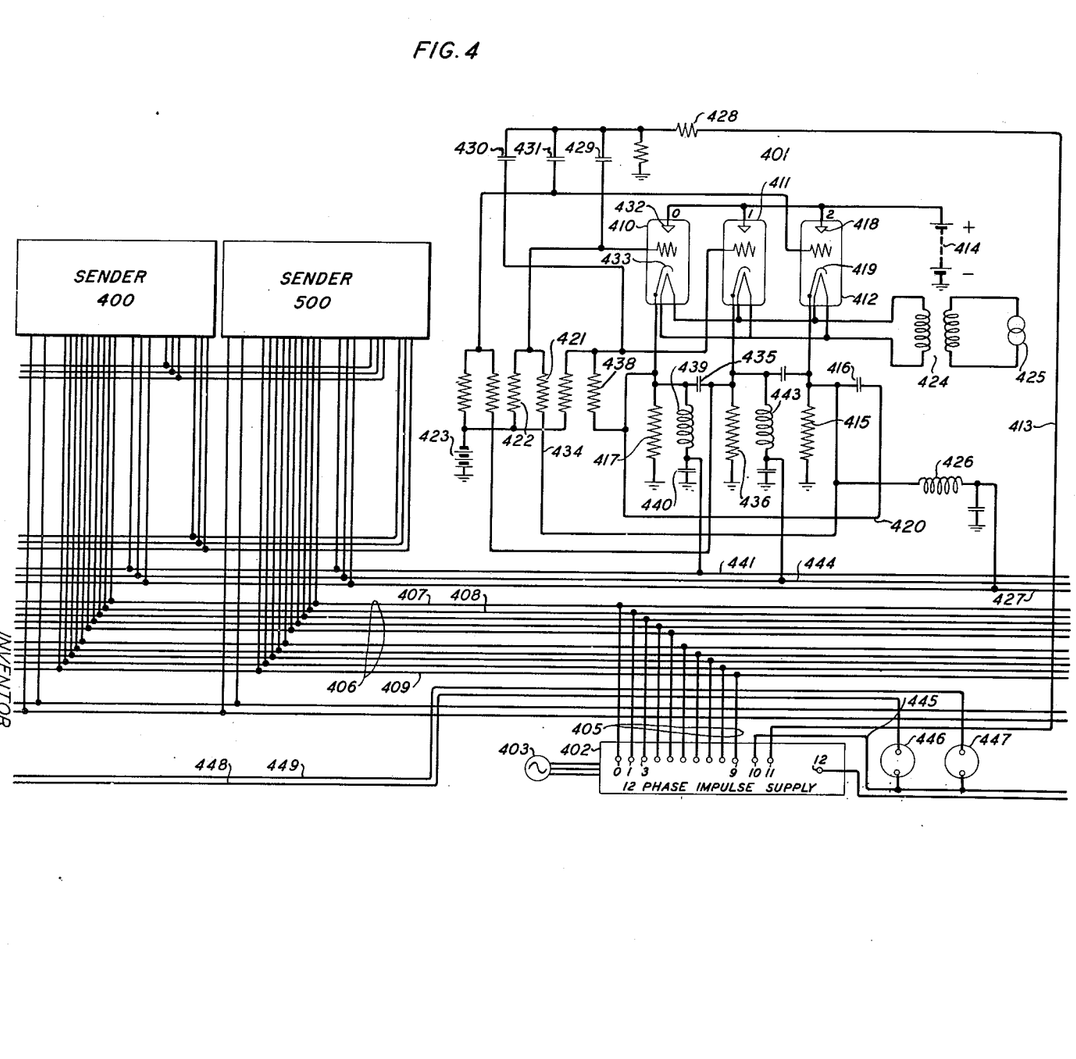
Figure 5:
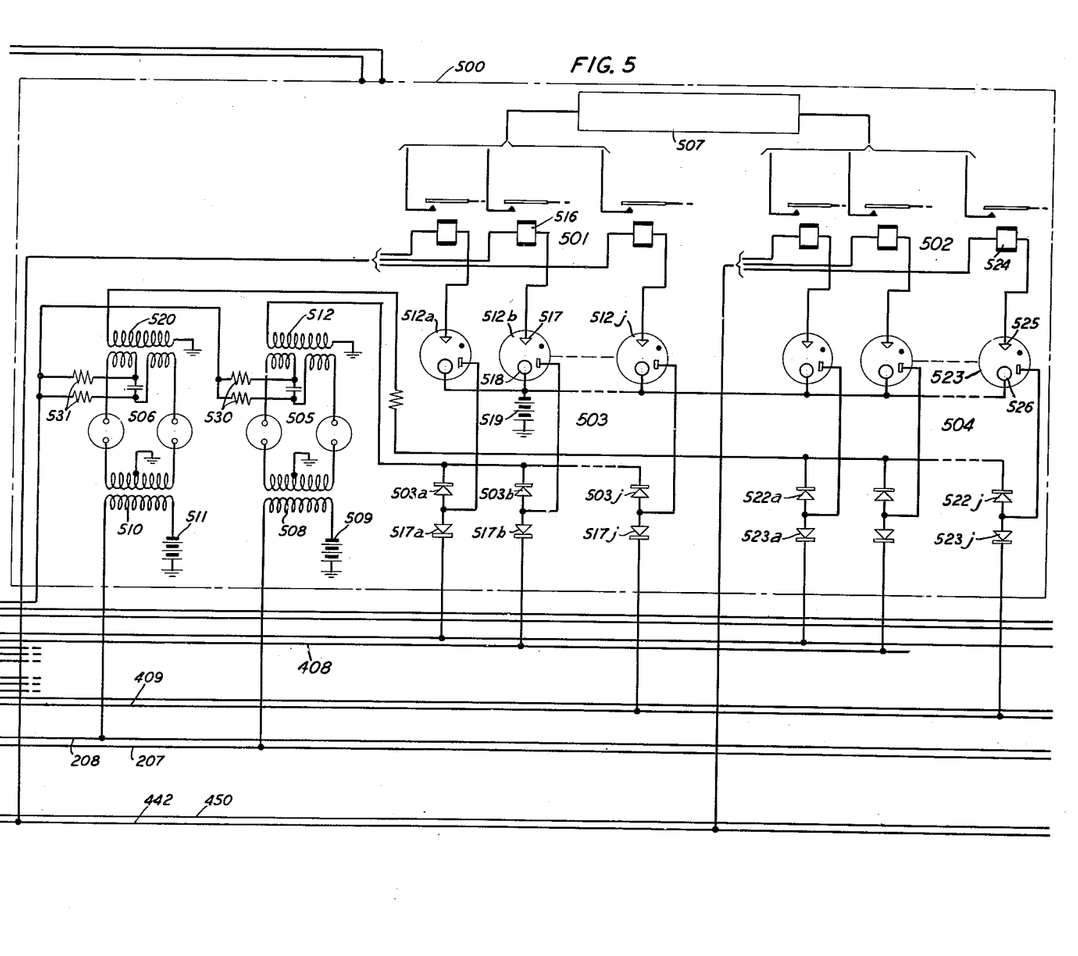

Each time the generator 402 passes through phase No. 10 a test is made to determine the continuity of operating condition, and absence of ground upon the common transmitting conductors 207 and 208 extending from the senders to the markers. This test is performed by the testing and alarm mechanism shown in Fig. 6. As the generator 402 enters phase No. 10 an impulse is transmitted over impulse lead 445 through the discharge tubes 446 and 447 thence over conductors 448 and 449 to join conductors 207 and 208, respectively, adjacent the senders (see Fig. 2) and from thence the circuits continue over conductors 207 and 208 to the lower members of two pairs of rectifiers 605 and 606, respectively. At the same instant an impulse of phase No. 10 is transmitted over conductor 450 to the upper members 608 and 609 of the pairs of rectifiers. The impulses thus supplied over conductor 450 as well as conductors 207 and 208 are positive and are applied to the rectifier to which they are connected in the non-conducting direction, that is, the direction in which the conductance is less. If the impulses on rectifier 605 and the impulses on rectifier 608 coincide in time a positive potential which is sufficiently high to start the tube is supplied to the starter anode 610 of tube 601 and, likewise, if the potential supplied to rectifiers 606 and 609 coincide in time a potential sufficiently high to start the tube is supplied to the starter anode 611 of tube 602. When these tubes 601 and 602 are thus ionized by their control electrodes timed intermittent current flows from the supply lead 442 through the windings of the slow release relays 603 and 604, main anodes of the tubes 601 and 602, main cathodes of these tubes, to negative battery 619. Under this condition these impulses which occur in the conductors 207 and 208 once per cycle of the generator 402 are sufficient to maintain the relays 603 and 604 continuously operated to hold open the respective alarm circuit paths 607. However, should a failure occur in one of the conductors 207, 208, the ionizing impulses cease to appear, and the corresponding relays 603, 604 release to close the alarm circuit. If the failure occurs in but one of the conductors 207, 208 one of the alarm circuit paths will be closed. The manner in which this failure causes the tubes 601, 602 to be ionized is much analogous to the operation of the tubes 512a–512j associated with the respective sets of rectifiers 503a, 517a, etc. This is because an impulse applied to only one rectifier, for example, 608, meets a high resistance whereas the impedance of the path to ground to the opposing rectifier element 605 is very small. For this reason the intermediate point between the two rectifiers fails to acquire a potential of any considerable magnitude and, consequently, the ionizing electrode 610 is not raised to a sufficient positive potential to ionize the tube. Thus, the main feature of the invention is applied in the alarm circuit of Fig. 6 as well as in the receiving circuit of Fig. 5, all in one and the same system. Thus, of the generic invention disclosed there are two different exemplary species.

Among the many modifications which may occur to one skilled in the art is one in which each rectifier such as 608 consists of several elements in series or parallel all poled in the same direction. The rectifiers may consist of any of the many rectifying substances or crystals known in the art. Two which are commonly known are copper-oxide and germanium which are mentioned solely by way of example.

What is claimed is:

1. In a signaling system, a source of alternating current, means for generating a group of impulses in each of a plurality of successive time periods, means for distributing the impulses of each time period to individual conductors, a common conductor, means for selectively sending impulses of a time period over said common conductor and means for identifying selectively the time period of said last named impulses comprising a plurality of detectors, one for each impulse of a group, each detector connected in series opposition between said common conductor and one of said individual conductors, said detectors composed of asymmetrical conducting elements, and means connected to the common point between said detectors responsive to impulses simultaneously applied to said common conductor and said individual conductors.

2. In a signaling system, a source of alternating current, means for generating a group of impulses in each of a plurality of successive time periods, means for distributing the impulses of each time period to individual conductors, a common conductor, means for selectively sending impulses of a time period over said common conductor and means for identifying the position in the group of said selective pulses comprising a plurality of detectors, one for each impulse of a group, each detector comprising a pair of rectifiers having leakage in the non-pass direction connected in series opposition between said common conductor and one of said individual conductors and gas-filled tube means connected to the common point between said rectifiers responsive to impulses simultaneously applied to said common conductor and said individual conductor.

3. A plurality of sources of voltage having one common terminal, elements having widely differing conductivities for the two directions of current flow therethrough, said unsymmetrically conducting elements interconnecting said voltage sources to a common circuit extending to the common terminal of the sources of voltage and a voltage responsive element in this common circuit responsive to a voltage substantially equal to that of the voltage source which is the smaller in value of the two sources and unresponsive to materially smaller voltages.

4. A plurality of sources of voltage having a common terminal, rectifier elements having a finite resistance in the non-pass direction, the negative terminal for the pass direction of each of said rectifiers connected to a voltage source, all other terminals of said rectifiers connected together and to one terminal of a load circuit, the other terminal of the load circuit connected to the common terminal of the several voltage sources, whereby the voltage across the load will be substantially equal to the most negative of any of the sources of voltage at any instant.

5. A selective arrangement responsive to two input voltages simultaneously applied but unresponsive to either of the said input voltages applied non-simultaneously with the other, comprising two rectifier elements of good conductivity in one direction and some but little conductivity in the opposite direction, said elements being connected to a common point with their directions of good conductivity leading away from said point, a source for supplying one of said input voltages to one of said elements upon its terminal opposite the common point, a source for supplying the other of said input voltages to the other of said elements upon its terminal opposite the common point, a voltage responsive device connected to the common point, said voltage responsive device being such as to respond to the voltage acquired by the common point when the input voltages applied to the rectifiers are simultaneous but not to respond to the voltage acquired by the common point when one of the input voltages is applied to its rectifier alone.

6. A combination according to claim 5 wherein the voltage responsive device is the ignition path of a gas-filled discharge tube.

7. In combination, a leaky rectifier connected in a series path in opposition to a similar leaky rectifier, a source of intermittent pulses applied to one terminal of said path, such pulses being of a given polarity opposite to the rectifier to which they are directly applied, a source of intermittent pulses of similar polarity applied to the other end of said path, and a voltage controlled device normally of high impedance connected to the midpoint of said path.

8. An electrical system comprising a plurality of rectifiers having low impedance for currents due to voltages applied in one direction thereacross and much higher impedance in the reverse direction, said rectifiers each having one similar terminal connected to a common point, a plurality of paths each provided at times with sources of voltages above a minimum value applied across said rectifiers toward said common point in the high impedance direction, a work path including a voltage responsive device operable by a voltage above said minimum value connected to said common point, a reference point remote from said common point to which all of said paths extend, all the foregoing whereby said voltage responsive device responds whenever all of said sources are simultaneously above said minimum value.

9. A selective arrangement comprising a plurality of pairs of pronouncedly asymmetrically conducting devices, each pair having a common point, means for simultaneously impressing upon one of each pair of said devices a voltage above a minimum looking toward said common point but in the non-conducting direction of said rectifiers, means for selectively impressing a voltage of like sign and value upon the other devices of certain of said pairs of devices, and a voltage responsive device connected to each common point unresponsive to less than the said minimum voltage but responsive to a voltage greater than said minimum voltage.

10. A combination in accordance with claim 9 in which each voltage responsive device includes ignition electrodes of a trigger type space discharge device.

11. A combination in accordance with claim 10, wherein each of the iginition electrodes, upon response to said voltage, cause the establishment of a discharge between main electrodes, a response element and a source of voltage in circuit with each such main electrodes, said discharge tending to continue, upon establishment, and means independent of said voltage responsive device for discontinuing such discharges when their respective response elements have accomplished the effect required incident to their response.

WILLIAM H. T. HOLDEN.

REFERENCES CITED

The following references are of record in the file of this patent:

UNITED STATES PATENTS

| Number | Name | Date |
|---|---|---|
| 2,300,505 | Hubbard | Nov. 3, 1942 |
| 2,373,134 | Massonneau | Apr. 10, 1945 |
| 2,390,778 | Cook | Dec. 11, 1945 |
| 2,428,563 | Fountain | Oct. 7, 1947 |